US009351215B2

(12) United States Patent
Webb (10) Patent No.: US 9,351,215 B2
(45) Date of Patent: May 24, 2016

(54) TERMINAL HANDOVER
(75) Inventor: William Webb, Cambridge (GB)
(73) Assignee: Neul Ltd., Cambridge (GB)
( * ) Notice: Subject to any disclaimer, the term of this patent is extended or adjusted under 35 U.S.C. 154(b) by 144 days.
(21) Appl. No.: 14/126,064
(22) PCT Filed: Jun. 12, 2012
(86) PCT No.: PCT/EP2012/061106
§ 371 (c)(1),
(2), (4) Date: Apr. 16, 2014
(87) PCT Pub. No.: WO2012/171910
PCT Pub. Date: Dec. 20, 2012

(65) Prior Publication Data
US 2014/0219092 A1 Aug. 7, 2014

(30) Foreign Application Priority Data

Jun. 13, 2011 (GB) .................................. 1109829.0
Jun. 13, 2011 (GB) .................................. 1109830.8
Jun. 13, 2011 (GB) .................................. 1109836.5
Jun. 13, 2011 (GB) .................................. 1109837.3
Jun. 13, 2011 (GB) .................................. 1109840.7
Jun. 13, 2011 (GB) .................................. 1109844.9
Jun. 13, 2011 (GB) .................................. 1109848.0
Jun. 13, 2011 (GB) .................................. 1109850.6
Jun. 13, 2011 (GB) .................................. 1109853.0
Jun. 13, 2011 (GB) .................................. 1109854.8
Jun. 13, 2011 (GB) .................................. 1109863.9
Jun. 13, 2011 (GB) .................................. 1109867.0
Jun. 13, 2011 (GB) .................................. 1109874.6
Sep. 8, 2011 (GB) .................................. 1115527.2
Sep. 30, 2011 (GB) .................................. 1116910.9

(51) Int. Cl.
H04W 36/22 (2009.01)
H04L 12/801 (2013.01)
(Continued)

(52) U.S. Cl.
CPC ............... *H04W 36/22* (2013.01); *H04B 1/713* (2013.01); *H04L 5/0032* (2013.01);
(Continued)

(58) Field of Classification Search
CPC . H04W 36/22; H04W 36/02; H04W 36/0083; H04W 36/0072; H04W 88/06; H04W 88/10; H04W 28/065; H04W 56/001; H04W 72/1215; H04W 12/06; H04W 16/14; H04W 36/36; H04W 36/24; H04W 36/245; H04W 36/165; H04W 36/16; H04W 36/0088; H04W 36/0005; H04W 36/00; H04W 36/0094; H04W 36/0011; H04W 28/0289; H04L 67/28; H04L 5/0053
USPC .................................................. 370/235, 331
See application file for complete search history.

(56) References Cited

U.S. PATENT DOCUMENTS 6,490,452 B1 * 12/2002 Boscovic et al. ............. 455/436
8,396,086 B1 * 3/2013 Gossett et al. ................ 370/508
(Continued)

FOREIGN PATENT DOCUMENTS

EP 1458209 A2 9/2004
EP 1513364 A2 3/2005
(Continued)

*Primary Examiner* — Kwang B Yao
*Assistant Examiner* — Ricardo Castaneyra
(74) *Attorney, Agent, or Firm* — Slater Matsil, LLP (57) ABSTRACT A communication terminal for receiving a communication service from a network that is configured to provide communication services to terminals via a plurality of communication devices, the terminal being configured to receive a communication service from a communication device, receive, from that communication device, a request that it handover from that communication service to another provided by the network and decide, responsive to that request, whether or not to handover from that communication service to another provided by the network.

8 Claims, 5 Drawing Sheets (51) Int. Cl.

| | |
|---|---|
| *H04L 7/04* | (2006.01) |
| *H04L 25/06* | (2006.01) |
| *H04W 4/00* | (2009.01) |
| *H04W 64/00* | (2009.01) |
| *H04W 72/12* | (2009.01) |
| *H04B 1/713* | (2011.01) |
| *H04L 5/00* | (2006.01) |
| *H04W 8/18* | (2009.01) |
| *H04W 56/00* | (2009.01) |
| *H04W 36/00* | (2009.01) |
| *H04W 72/04* | (2009.01) |
| *H04W 28/06* | (2009.01) |
| *H04W 24/02* | (2009.01) |
| *H04L 29/08* | (2006.01) |
| *H04L 29/06* | (2006.01) |
| *H04B 7/26* | (2006.01) |
| *H04W 16/14* | (2009.01) |
| *H04W 88/10* | (2009.01) |
| *H04W 12/06* | (2009.01) |

(52) U.S. Cl.
CPC .............. *H04L 7/041* (2013.01); *H04L 25/061* (2013.01); *H04L 47/10* (2013.01); *H04L 67/28* (2013.01); *H04L 69/18* (2013.01); *H04W 4/005* (2013.01); *H04W 8/18* (2013.01); *H04W 24/02* (2013.01); *H04W 28/065* (2013.01); *H04W 36/0066* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(56) References Cited

U.S. PATENT DOCUMENTS

| | | | |
|---|---|---|---|
| 2004/0176094 A1* | 9/2004 | Kim et al. .................... | 455/438 |
| 2005/0096051 A1* | 5/2005 | Lee et al. ..................... | 455/438 |
| 2006/0140117 A1* | 6/2006 | Aerrabotu et al. ........... | 370/232 |
| 2008/0076426 A1 | 3/2008 | Nam | |
| 2008/0167047 A1* | 7/2008 | Abedi ........................... | 455/442 |
| 2008/0242301 A1* | 10/2008 | Osterling .............. | H04W 36/08 |
| | | | 455/436 |
| 2010/0120431 A1* | 5/2010 | Hwang et al. ................ | 455/436 |
| 2011/0299446 A1 | 12/2011 | Chun et al. | |

FOREIGN PATENT DOCUMENTS

| | | |
|---|---|---|
| EP | 2373107 A1 | 10/2010 |
| WO | 0201892 A2 | 1/2002 |
| WO | 2008060119 A1 | 5/2008 |
| WO | 2010057127 A1 | 5/2010 |
| WO | 2010095876 A2 | 8/2010 |

\* cited by examiner

TERMINAL HANDOVER

The invention relates to providing communication terminals with one or more communication services via a communication device.

The majority of communication devices are primarily intended to communicate data whilst they are being operated by a nearby user. For example, a typical telephone or personal computer is designed to allow a user who is holding, or is at least near to, the device to speak or type data into the device and to communicate that data to a user at another location. For this purpose the device is typically provided with a user interface that includes means for accepting data from a user and means for providing data to a user. The means for accepting data from a user could, for example, be a keypad, microphone or touch-screen. The means for providing data to a user could, for example, be a display, loudspeaker or an indicator light.

Some computers are designed for unattended operation. One example is a web server located in a server farm. Whilst this can if necessary be controlled by means of a local keypad and display, in normal operation administrative tasks are performed on the server by means of a communications link to a personal computer located elsewhere, and inputs from the user interface of that personal computer are transmitted over a network to the server. Similarly, when the web server is in a communication session with a client browser running on a remote personal computer, the data served by the web server is provided in response to inputs that the user of that remote personal computer provides to the personal computer.

In each of the instances described above, the communication links between the devices in question need to provide a reasonably low degree of latency so that the users will be satisfied with the responsiveness of the links. For example, when two users are communicating through their telephones, they expect to be able to hear each other's speech substantially in real time; or when a user is controlling or is in a web session with a web server he will expect to receive prompt responses from the server. If there is a long delay in communication, the user may become frustrated and can be expected to eventually close the link.

It is anticipated that there will be an increase in the number of devices that communicate automatically without a user being in attendance. For example, it has been forecast that in the future devices such as domestic appliances, motor vehicles and utility meters will commonly be capable of sending data to report on their operational state and receiving data such as upgraded operating software. It is widely predicted that the preferred way for these devices to communicate will be via the Internet, with their initial access to the internet being over a wireless link.

The protocol for the wireless link is suitably one that is optimised for machine-to-machine communication. Preferably the protocol also operates in so-called whitespace: a part of the spectrum that is made available for unlicensed or opportunistic access. Conveniently, that may be in the UHF TV band and spans all or part of the range from 450 MHz to 800 MHz, depending on the country. A large amount of spectrum has been made available for unlicensed wireless systems in this frequency range. A problem with operating in whitespace is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in whitespace must reference a database that determines which channels may be used in any given location. This is intended to avoid interference with the TV transmissions and certain other incumbent systems such as wireless microphones. The network will also have to coexist with spurious interference from devices such as electric drills. In order to minimise the impact of the machine-to-machine network on television broadcasts and the negative impact of external interferers on the machine-to-machine network, the network preferably implements a frequency hopping sequence generated in dependence on information in the whitespace database and designed to avoid frequencies found to suffer interference and/or poor propagation or throughput.

The network is suitably arranged as a cellular network, in which single base station is arranged to service the terminals located in a particular geographical region. Some of the terminals may be static but others may be mobile, meaning that their location within the network may change in time. Therefore, the network is preferably able to: (i) determine the location of a mobile terminal if required; and (ii) deal with the situation when a terminal moves from the service area of one base station to that of another. Also, although the geographic regions associated with each base station may be notionally distinct from one another, in practice it is likely that some terminals are able to communicate with base stations in neighbouring cells. Therefore, if one base station is unduly loaded compared with its neighbours, it might conceivably be possible for some of that traffic may be diverted to its neighbour. One or more of these issues may be addressed by providing the network with a mechanism for handover by means of which a terminal may be transferred from one base station to another.

The principle of handover is well-known in cellular networks. However, different considerations apply in machine-to-machine networks, which are more tolerant of high latency and dropped communications than traditional cellular networks. Also, communication in machine-to-machine networks tends to be predictable and is often relatively infrequent. There is a need for optimising the mechanism of handover to the particular requirements and capabilities of machine-to-machine networks.

According to a first embodiment of the invention, there is provided a communication terminal for receiving a communication service from a network that is configured to provide communication services to terminals via a plurality of communication devices, the terminal being configured to receive a communication service from a communication device, receive, from that communication device, a request that it handover from that communication service to another provided by the network and decide, responsive to that request, whether or not to handover from that communication service to another provided by the network.

The communication terminal may be configured to receive a request from the communication device that it handover to another communication device in the network, and to decide, responsive to that request, whether or not to handover from that communication device to another in the network.

The communication terminal may be configured to receive a request from the communication device that indicates an identity associated with one or more other communication devices in the network.

The communication terminal may be configured to decide whether or not to handover to another communication device in the network in dependence on those identities.

The communication terminal may be configured to receive a request from the communication device that it communicate via a different carrier frequency supported by the communication device and to decide, responsive to that request, whether or not to handover to that carrier frequency.

The communication terminal may be configured to decide whether or not to handover to another communication service in dependence on a signal quality associated with the other communication service.

The communication terminal may be configured to decide whether or not to handover to another communication service in dependence on how much data the communication terminal anticipates having to communicate in the future via the network.

The communication terminal may be configured to, if it determines that it will have relatively little data to communicate in the future, not handover to another communication service.

The communication terminal may be configured to, if it decides not to handover to another communication service, continue using the communication service.

The communication terminal may be configured to receive, as the request, an indication that the communication service is overloaded The communication terminal may be configured to decide independently of the communication device whether or not to handover from the communication device.

The communication device may be configured to decide whether or not to handover from the communication device using one or more algorithms adapted to optimise resource allocation across the network.

According to a second embodiment of the invention, there is provided a communication network comprising a plurality of communication devices that are each configured to provide communication services to at least one communication terminal, the communication network being configured to determine that a communication service offered by one of the plurality of communication devices is overloaded and that a communication terminal receiving that communication service should handover from the overloaded communication service to another provided by the network, and request the communication terminal to handover to another communication service; the communication terminal being configured to decide, responsive to that request, whether or not to handover from that communication service to another.

The communication network may be configured to determine that a communication service offered by one of the plurality of communication devices is overloaded in dependence on a loading associated with others of the communication devices.

The communication network may be configured to determine that the communication terminal attached to the communication device should handover to another communication device.

The communication network may be configured to determine that the communication terminal attached to the communication device should handover to another carrier frequency supported by the communication device.

The communication network may be configured for machine-to-machine communication.

The communication network may be configured to operate in whitespace.

According to a third embodiment of the invention, there is provided a method for providing communication services to a terminal via a communication network comprising a plurality of communication devices that are each configured to provide a communication service to at least one terminal, the method comprising determining that a communication service offered by one of the plurality of communication devices is overloaded and that a terminal receiving that communication service should handover from the overloaded communication service to another provided by the network, requesting the communication terminal to handover to another communication service and deciding in the terminal, responsive to the request, whether or not to handover from that communication service to another.

The present invention will now be described by way of example with reference to the accompanying drawings. In the drawings.

A communication terminal may be provided with at least one communication service by a network. Suitably the service is provided by a communication device. The network may comprise a plurality of communication devices, each of which are configured to provide communication services to a plurality of terminals. On occasion it may be preferable from the communication device's perspective for a terminal to be transferred from one communication service to another because the service it is receiving is overloaded. The terminal may accordingly receive an indication from its communication device that it should transfer to another communication service. The terminal may then decide independently whether or not to accede to that request.

A communication device is suitably configured to communicate with one or more terminals. Typically these terminals will be located in a particular "cell", i.e. a geographical area that the communication device services. The communication device is, however, suitably configured to communicate with any terminal that is "attached" to it, i.e. any terminal that has previously registered itself with the communication device (more details on this process are given below). The communication device may be considered as being responsible for providing communication services to all of the terminals attached to it. A terminal is suitably attached to only one communication device at a time. "Handover" may be viewed as a process of detaching from one communication service offered by the network and attaching to another. Often "handover" involves detaching from one communication device and attaching to another but it may also just involve switching between different services provided by the same communication device (e.g. by switching to a different carrier frequency).

One or more embodiments of the invention will now be described with specific reference to a wireless network in which the communication device is a base station. This is for the purposes of example only and it should be understood that the mechanisms described herein may be implemented in any suitable communication device, irrespective of what particular role that device plays within the network.

Figure 1:
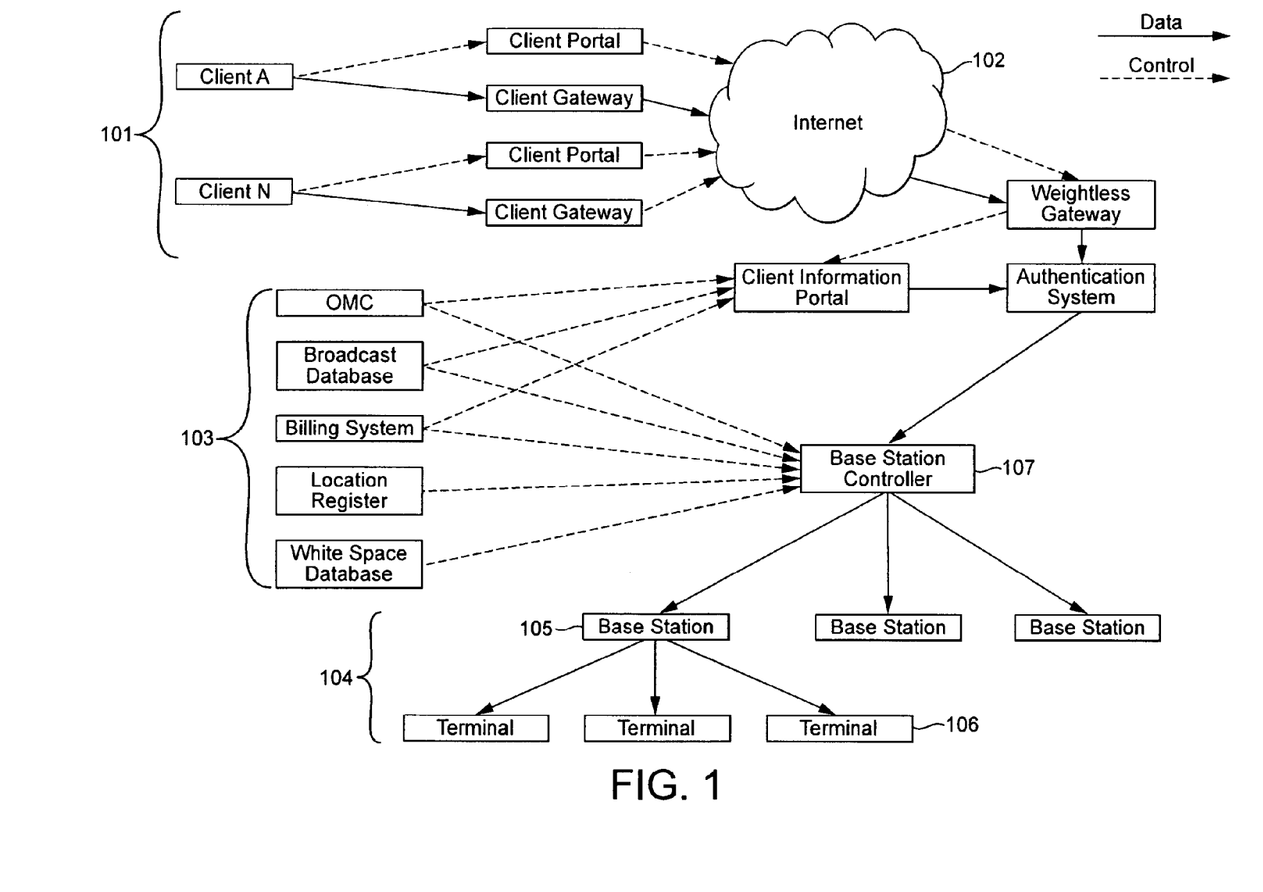
FIG. 1 shows an example of a machine-to-machine network.

An example of a wireless network is shown in FIG. 1. The network, shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are entities embedded or machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. The network may be arranged to communicate with a client-facing portion 101 via the Internet 102. In this way a client may provide services to the terminals via the wireless network.

Other logical network elements shown in this example are:

Core network. This routes traffic information between base stations and client networks.

Billing system. This records utilisation levels and generates appropriate billing data.

Authentication system. This holds terminal and base station authentication information.

Location register. This retains the last known location of the terminals.

Broadcast register. This retains information on group membership and can be used to store and process acknowledgements to broadcast messages.

Operations and maintenance centre (OMC). This monitors the function of the network and raises alarms when errors are detected. It also manages frequency and code planning, load balancing and other operational aspects of the network.

White spaces database. This provides information on the available white space spectrum.

Client information portal. This allows clients to determine data such as the status of associated terminals, levels of traffic, etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are well-adapted to tolerating the delays and breaks in communication that can result from these varying communication conditions. The network is also preferably adapted to the communication conditions by, for example, making use of frequency hopping sequences (which are suitably different for neighbouring cells), different data rates (which can be adapted to the signal conditions and technical capabilities of the relevant terminals), spreading codes and acknowledgement mechanisms so that lost packets can be identified and resent.

In many applications terminals will be static (e.g. electricity meters) but there are some applications where terminals will be mobile (e.g. vehicle telemetry). The network should be capable of managing this mobility. If the network is configured for machine-to-machine communications, the network is unlikely to have to offer seamless connections since a short break in transmission while a terminal moves to a different cell is likely to be acceptable. Therefore, full handover support is not necessary. Terminals may be configured to manage their own mobility by discovering the strongest base station in their region and registering with that base station. The algorithms used in the terminal to determine when to search for other base stations preferably take into account the fact that in regions of overlapping coverage, higher data rates may be available from some of those base stations compared to others.

Figure 2:
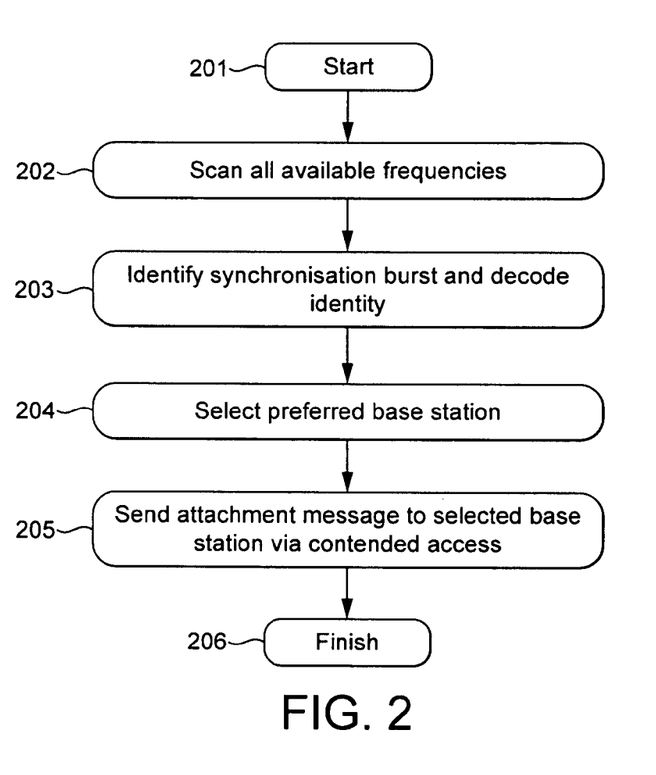
FIG. 2 shows an example of a process for attaching to a communication device.

An example of a process that a terminal may use when attaching to a base station is shown in FIG. 2. The process starts in step 201. Suitably a terminal scans all available frequencies when it is turned on, looking for a synchronisation burst from a base station (step 202). Once a synchronisation burst is identified, the terminal may decode the base station identity and associated information contained in that burst (step 203). Suitably the base station transmits a synchronisation burst in the header portion of every frame that it transmits (e.g. in the DL_FCH field). If the terminal discovers multiple base stations it selects its preferred base station according to its internal algorithms (step 204). In general it will prefer the base station with the strongest signal level. The terminal also may prefer the base station offering the highest data rate. However, in some instances the preferred base station may be a private base station, in which case the terminal is only permitted to attach if its identity is pre-stored in the base station's memory. The terminal will be able to determine that a base station is a private one based on information contained in the synchronisation burst. Base stations are suitably able to update the pre-stored list of terminal identities at any time.

Once a base station has been found that the terminal can attach to it sends a contended access message to the base station providing details of its identity and its capabilities, such as the communication modes it supports (step 205). Periodic attachment messages are not needed. The network assumes a terminal remains attached to a given carrier on the base station until it attaches to a different carrier, base station or sends a detach message. The process terminates in step 206.

The network preferably leaves the decision to hand off to a different base station with the terminal. This minimises the network resources that need to be allocated to handoff by avoiding the substantial signalling between the base station and the terminal (of measured signal levels, handover commands etc) and between neighbouring base stations (of terminal identities, communication capabilities etc) that would otherwise be required.

Terminals may choose to periodically measure signal levels from all available cells in their location and hand off to a different cell where there is a material improvement in signal level. Moving terminals preferably make these measurements on a frequent basis so as to keep up-to-date with changes in signal levels as they move around. For static terminals, such measurement may be made as instructed by the base station. For example, the base station may be aware of a new cell recently inserted into the network and trigger a re-scan from all its attached terminals accordingly.

There are situations when the network would function better if the terminals handed over to different cells. For example, when: (1) a better signal strength is available from a neighbouring cell, allowing faster data transmission and hence a reduction in network resource requirements; and (2) a cell is congested but neighbouring cells are not. Therefore, the network may "encourage" the terminal to consider handoff.

Handover can be used to implement a distributed method of load balancing across cells in a network. If the network determines that one cell is congested, but that neighbouring cells are uncongested, it may inform the terminals in the congested cell of this. The decision to move to a different cell is, however, preferably left to the terminal. The terminal uses pre-defined algorithms in order to decide whether to move. These algorithms are preferably designed to result in optimal loading and resource allocation across the network.

It is desirable in cellular networks for loading to be reasonably evenly balanced across cells such that no one cell is congested when its neighbours are uncongested. Balancing can often be achieved by identifying terminals that are able to receive coverage from more than one cell and moving enough of these terminals to less congested cells to re-balance the loading.

In many cellular networks the base station or the network controls all aspects of terminal mobility, including handover. In these networks it is straightforward to load balance since the network can identify those terminals that should be moved and issue handover instructions to them. However, in a machine-to-machine network, terminal mobility is preferably controlled by the terminal and not the network, with the terminal making relatively autonomous decisions as to the best cell to register on to.

When the network detects a condition where load balancing is required, it may send messages to terminals informing them of the cell that is congested and optionally providing the identities of nearby cells that are uncongested. Each terminal then decides independently whether or not to move to a different cell based on factors including:

The relative signal level from the alternative cells. If the new cells offer poor signal quality then the terminal will prefer not to move. This is also preferred from the network's perspective since a high spreading factor may be required in the alternative cell, consuming a disproportionate proportion of network resources.

The ability of the terminal to scan alternative cells. For example, for very low power terminals, the battery drain associated with scanning may be seen as overly high.

The expected traffic level from the terminal. If the terminal does not anticipate sending much traffic in the coming time period then the benefits from moving may be outweighed by the signalling traffic involved.

Terminals that conclude they should move preferably wait a random length of time before performing the handover to avoid a sudden flood of traffic from one cell to another. The terminal preferably monitors its current base station to see whether the situation changes during this waiting period. If so, moving may no longer be necessary.

Figure 3:
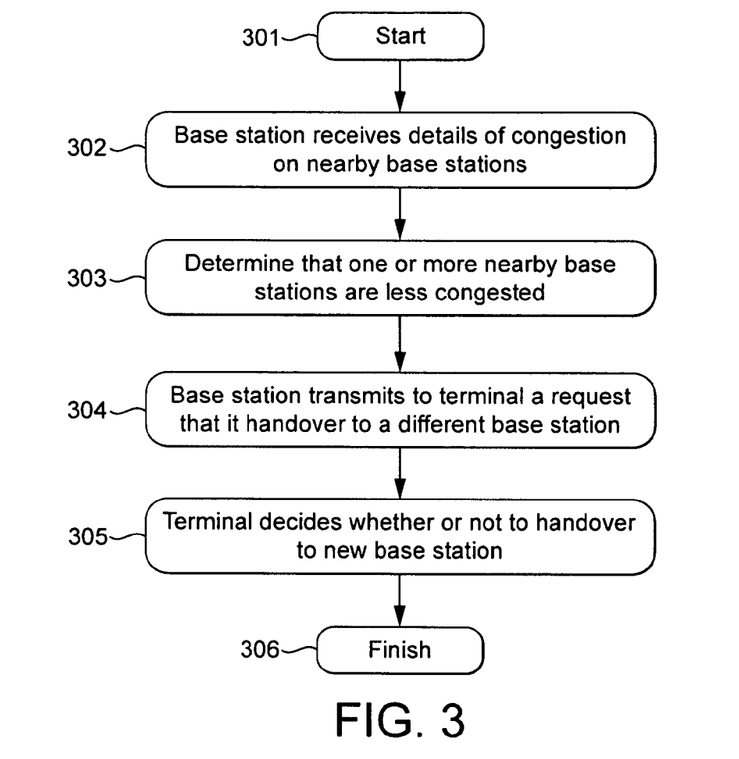
FIG. 3 shows an example of a process for handing over from one base station to another.

An example of a process by which a terminal may handover from one base station to another is shown in FIG. 3. The process starts in step 301. In step 302 a congested base station receives details of levels of congestion on base stations in the vicinity from the core network. If one or more of these base stations is substantially less congested, the base station may indicate to one or more attached terminals a preference for them to reattach to the uncongested base stations (step 303). The base station may be configured to do this by sending a handover message followed by the identities of the uncongested base stations (step 304). The message preferably also contains details of the other base station's frequency hopping sequences to assist the terminals in attaching to those base stations. This message may suitably be sent via the broadcast control channel. However, although the base station uses this message to suggest to the terminal that it handover to another base station, the final decision whether or not to handover remains with the terminal (step 305). Terminals may make their own decision as to whether to hand off to a neighbouring cell based on, for example: (1) whether they have good coverage from that cell; and (2) whether they are likely to generate substantial traffic levels in the coming hours. For example, it will generally make little sense for an energy meter to hand over to a new cell because the signalling load involved in that handover is likely to be higher than the number of messages the meter expects to transmit during the period of congestion. When deciding whether to hand off to another cell based on likely upcoming traffic levels, the terminal will preferably estimate the predicted traffic loading to be generated in the time period indicated for congestion. If the predicted traffic loading is less than the signalling load associated with moving from one base station to another and back again then the terminal will not hand off to the other base station. The estimate of the predicted traffic loading can be made on the basis of the traffic levels generated during the previous time period, or on some other specific information available to the terminal.

Handover is not restricted to transferring terminals from one base station to another. Handover may also be used to transfer a terminal between different traffic services offered by a single base station. For example, some base stations may support multiple carriers simultaneously. Such a base station may perform load balancing across those carriers using a similar approach to that described above, i.e. by suggesting to particular terminals or classes of terminals that they handover to a different carrier. The message comprising this suggestion may also include details of the carrier to which the terminal should attach.

Leaving the final decision on handover to the terminal allows the signalling load involved in mobility management to be reduced, as explained above. There are a number of factors specific to machine-to-machine networks that enable handover to reside largely within the terminal, including the relatively infrequent nature of communications involving any particular terminal and the predictable nature of their timing. In addition, by having each terminal make its decision in dependence on algorithms that are suitably implemented by a large number of terminals throughout the network, it is possible for effective load balancing to be achieved even though ultimate management of handover resides principally in the terminals.

Handover may also be used to determine terminal location. It is often advantageous to be able to determine the location of a terminal. For example, when deploying environmental sensors the network may determine the location of the sensor after deployment to make the deployment process more straightforward. Alternatively, location determination can be useful for tracking the location of assets.

The accuracy with which a terminal's location can be determined will depend on a number of issues including base station timing accuracy, number of base stations in range of the terminal and the terrain (because of the resultant multi-path effects). There are two main methods of location: passive and active. Both are preferably supported by the network. Both methods start with a message from the network requesting the terminal instigate the location procedure.

In passive location a terminal monitors the transmissions from as many base stations as possible and determines the relative time of arrival of the synchronisation burst from each. It also decodes the identity of each base station. It then returns to its "home" base station the identities and timings of each synchronisation burst relative to the home base station. The base station then passes this information to the location server in the network which uses its knowledge of the location of each base station to triangulate the terminal location. This is then sent back to the client. Passive location requires accurate synchronisation of each of the base stations implying each base station has access to an absolute time, such as GPS time or similar.

Figure 4:
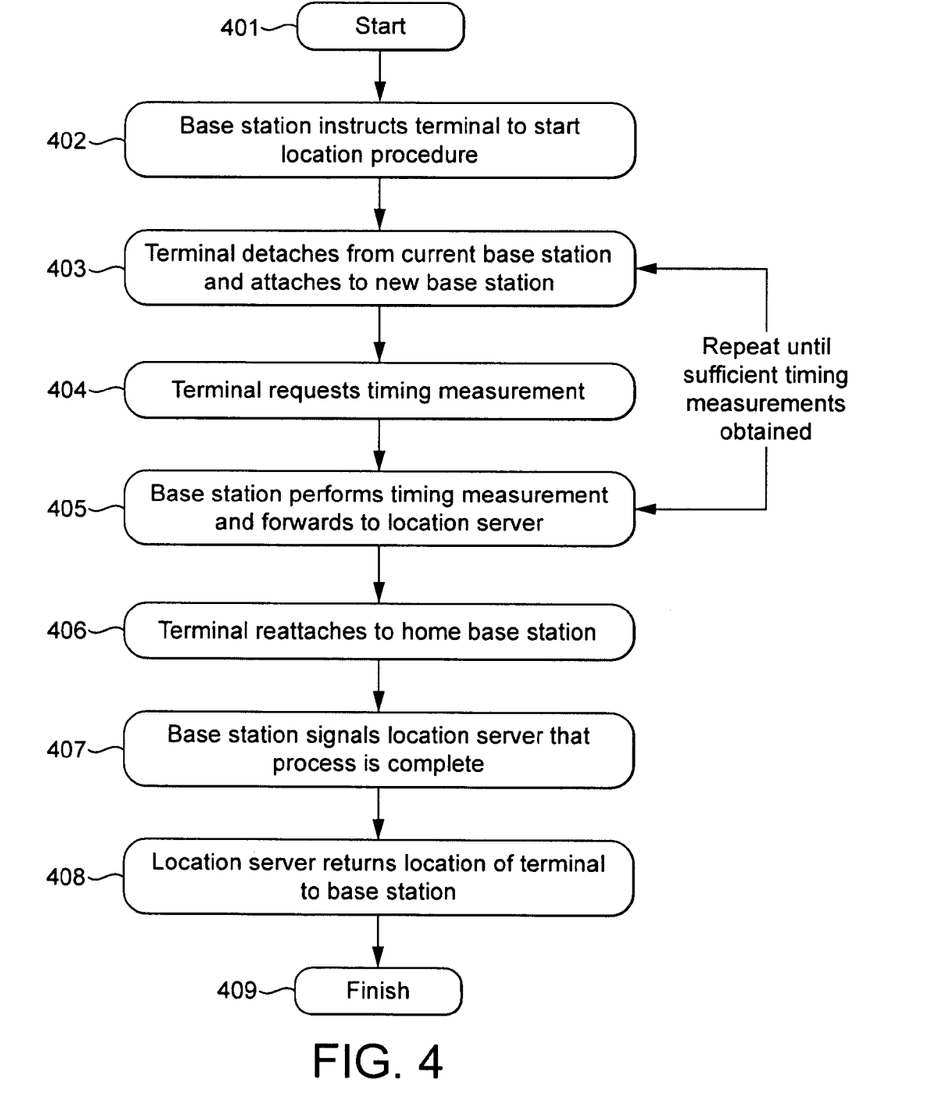
FIG. 4 shows an example of using handover to determine a terminal's location.

In active location the terminal detaches from the home base station and attempts to attach to as many other base stations as it can. An example of this process is illustrated in FIG. 4. The process commences in step 401. In step 402 the base station instructs the terminal to start a location procedure. The terminal accordingly detaches from its home base station and attaches to a new base station (step 403). Once attached the terminal requests a timing measurement be made (step 404). The base station performs this measurement by determining the difference in timing between the start of an uplink frame as transmitted by the terminal and the actual time that the terminal transmission is received by the base station (step 405). The base station may forward this information and the terminal identity to the terminal, the original base station or (preferably) the location server. This process may be repeated multiple times with the terminal obtaining timing measurements from a number of different base stations (ideally, at least three measurements should be obtained). Once the terminal has completed this process, it returns to its original "home" base station and reattaches (step 406). The home base station may then determine the terminal's location itself (by means of the timing measurement performed by the other base station(s)) or it may signal to the location server that the process is complete, whereupon the location server determines the terminal's location (step 407). The location server returns the terminal's location to the home base station (step 408) and the process terminates in step 409.

The location calculation could be performed in the terminal, in which case the terminal should be provided with the locations of the base stations from which it obtained its timing measurements. However, this is not a preferred option as many terminals will be relatively simple devices with limited battery and processing power. In addition, the location of the terminal is usually required by the client rather than the terminal itself. Therefore, in most instances it will be more convenient to perform the calculation in the core network.

Using handover in this way has the advantage that the different base stations do not need to be synchronised. It is a mechanism that is not appropriate for pre-existing cellular networks due to the risk that a call or other communication might be missed while the terminal attaches to the other base stations. In machine-to-machine networks this does not tend to be an issue because: (i) the base station typically knows in advance when it will need to communicate with the terminal so it can schedule the location process accordingly; and (ii) in any event the network is designed to be tolerant of delays, high latency, lost packets etc due to the inherent unreliability of operating in whitespace.

Figure 5:
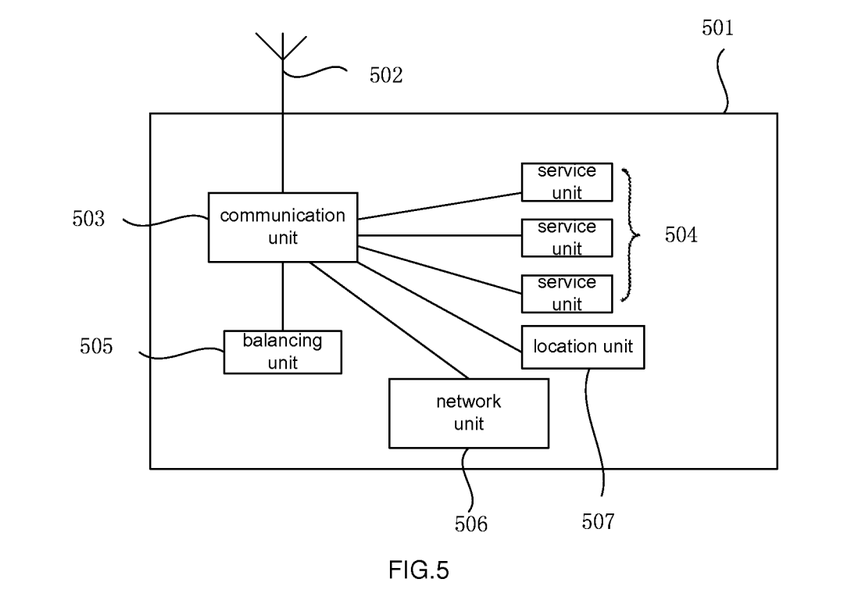
FIG. 5 shows an example of a communication device.

An example of the functional blocks that may be comprised in a communication device according to one embodiment of the invention are shown in FIG. 5. The communication device, shown generally at 501, comprises a communication unit 503 connected to an antenna 502 for transmitting and receiving messages. The communication device further comprises individual service units 504 for providing different communication services to the terminals attached to it. These different communication services might relate to different carrier frequencies, communication modes, data rates etc. The communication device further comprises a balancing unit 505 for determining that one or more communication services are overloaded and for indicating to one or more terminals that they should handover to a different service and/or communication device accordingly. The communication device also comprises a network unit for storing the identities and hopping sequences of neighbouring communication devices (506) and a location unit for providing the required signalling to a terminal and a location server when a terminal's location is to be determined (507). The location unit may also perform location calculations for determining a terminal's location and timing measurements for terminals that have attached to the communication device for location purposes. The communication unit may effectively act as a central controller and may pass information between the other functional blocks.

Figure 6:
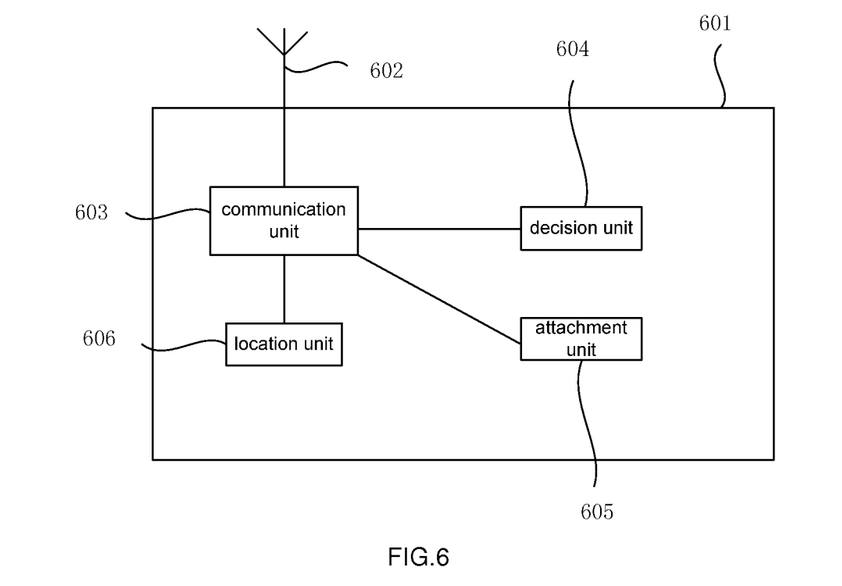
FIG. 6 shows an example of a communication terminal.

An example of the functional blocks that may be comprised in a communication terminal according to one embodiment of the invention are shown in FIG. 6. The communication terminal, shown generally at 601, comprises a communication unit 603 connected to an antenna 602 for transmitting and receiving messages. The communication terminal further comprises a decision unit 604 for deciding whether or not to handover to a different communication service responsive to a request from a communication device, an attachment unit 605 for attaching and detaching from communication devices and individual services provided by those devices and a location unit 606 for determining that different communication devices should be attached to and requesting the relevant timing measurements from those devices. The communication unit may effectively act as a central controller and may pass information between the other functional blocks.

The apparatus in FIGS. 5 and 6 are shown illustratively as comprising a number of interconnected functional blocks. This is for illustrative purposes and is not intended to define a strict division between different parts of hardware on a chip. In practice, the communication device and communication terminal preferably use a microprocessor acting under software control for implementing the methods described herein. In some embodiments, the algorithms may be performed wholly or partly in hardware.

Although one or more embodiments of the invention have been described above with specific reference to machine-to-machine networks, it should be understood that the mechanisms described above may be advantageously implemented in any type of network.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication terminal for receiving a communication service from a network that is configured to provide communication services to terminals via a plurality of communication devices, the terminal comprising a processor configured to:
   receive a request from the communication device that it handover to another communication device in the network; and
   decide, responsive to that request, whether or not to handover from that communication device to the other communication device in the network, wherein to decide comprises to estimate a predicted traffic loading to be generated in a time period indicated for congestion, and not to hard off to the other communication device when the predicted traffic loading is less than a signaling load associated with moving from the communication device to the other communication device and back again.

2. The communication terminal as claimed in claim 1, configured to receive a request from the communication device that indicates an identity associated with one or more other communication devices in the network.

3. The communication terminal as claimed in claim 2, configured to decide whether or not to handover to the other communication device in the network in dependence on those identities.

4. A communication network comprising a plurality of communication devices that are each configured to provide communication services to at least one communication terminal, wherein a communication device from the plurality of communication devices is configured to:
  determine that a communication terminal connected to the communication device should handover to another communication device; and
  request the communication terminal to handover to another communication device; and
  the communication terminal being configured:
  to decide, responsive to that request, whether or not to handover from that communication device to the other communication device in dependence of how much data the communication terminal anticipates to communicate in the future via the network, wherein to decide comprises to estimate a predicted traffic loading to be generated in a time period indicated for congestion, and not to hand off to the other communication device when the predicted traffic loading is less than a signaling load associated with moving from the communication device to the other communication device and back again.

5. The communication network as claimed in claim 4, wherein the network is configured for machine-to-machine communication.

6. The communication network as claimed in claim 4, wherein the network is configured to operate in whitespace.

7. A method for providing communication services to a communication terminal via a communication network comprising a plurality of communication devices that are each configured to provide a communication service to at least one terminal, the method comprising:
  determining that the communication terminal connected to a communication device should handover to another communication device;
  requesting the communication terminal to handover to the other communication device; and
  deciding in the terminal, responsive to the request, whether or not to handover from that communication device to the other communication device in dependence of how much data the communication terminal anticipates having to communicate in the future via the network, wherein the deciding comprises estimating a predicted traffic loading to be generated in a time period indicated for congestion, and not handling off to the other communication device when the predicted traffic loading is less than a signaling load associated with moving from the communication device to the other communication device and back again.

8. A communication network comprising a plurality of communication devices that are each configured to provide communication services to at least one communication terminal, wherein a communication device from the plurality of communication devices is configured to:
  determine that a communication terminal connected to the communication device should handover to another communication device; and
  request the communication terminal to handover to another communication device, the communication terminal being configured to decide, responsive to that request, whether or not to handover from the communication device to the other communication device in dependence of how much data the communication terminal anticipates having to communicate in the future via the network, wherein the terminal receives a communicate service from a network that is configured to provide communication services to terminals via a plurality of communication devices, and
  the terminal being configured to:
  receive, a communication service from the communication device;
  receive, from that communication device, the request that it handover from that communication device to another provided by the network; and
  decide, responsive to that request, whether or not to handover from that communication device to other communication terminal anticipates having to communicate in the future via the network wherein to decide comprises to estimate a predicted traffic loading to be generated in a time period indicated for congestion, and not to hand off to the other communication device when the predicted traffic loading is less than a signaling load associated with moving from the communication device to the other communication device and back again.

* * * * *